United States Patent [19]

Walker

[11] Patent Number: 4,474,319
[45] Date of Patent: Oct. 2, 1984

[54] HAND HELD FIBER OPTIC CLEAVING TOOL

[75] Inventor: Richard P. Walker, Saegertown, Pa.

[73] Assignee: GTE Products Corporation, Stamford, Conn.

[21] Appl. No.: 366,966

[22] Filed: Apr. 9, 1982

[51] Int. Cl.³ .............................................. B26F 3/00
[52] U.S. Cl. .................................... 225/96.5; 225/96; 225/101; 225/103; 225/105; 29/469; 83/925 R
[58] Field of Search ................... 83/564, 586, 925 R; 225/2, 96, 96.5, 101, 103, 105; 29/469

[56] References Cited

U.S. PATENT DOCUMENTS

| 4,074,840 | 2/1978 | Fulenwider et al. | 225/96.5 |
| 4,154,385 | 5/1979 | Lewis | 225/96.5 |
| 4,159,793 | 7/1979 | Belmonte et al. | 225/96.5 |
| 4,229,876 | 10/1980 | Doty | 29/469 |

Primary Examiner—E. R. Kazenske
Assistant Examiner—Taylor J. Ross
Attorney, Agent, or Firm—John A. Odozynski

[57] ABSTRACT

A hand held tool for cleaving optical fibers including an elongated body having a longitudinal axis extending lengthwise thereof. A fiber support surface is attached to the body and extends in a plane which is transverse to such longitudinal axis. Fiber cutting means are attached to the body and are selectively moveable in the general direction of the longitudinal axis away from the fiber support surface, and towards the fiber support surface for severing an optical fiber extending across the fiber support surface such that the end face of the fiber is smooth and lies in a plane perpendicular to the axis of the fiber. Tension means for subjecting the optical fiber to tension during the cleaving operation are provided including a first tension arm and a second tension arm each arm being pivotally attached to the body for pivotal movement about an axis transverse to the longitudinal axis, the tension arms being spring biased away from each other. Clamping means are provided for holding the optical fiber in place and include a first and second jaw member attached to the tension arms. Actuating means attached to the body are moveable in the direction of such longitudinal axis towards and away from the cutting means for causing pivotal movement of the tension arms about such transverse axis to urge the arms together, and for urging the cutting means away from the fiber support surface, when the actuating means moves towards the fiber support surface, and for allowing the tension arms to be pivoted about such transverse axis away from each other to subject the fiber to tension while the cutting means moves towards the fiber support surface to cleave the fiber, when the actuating means are moved away from the fiber support surface.

9 Claims, 10 Drawing Figures

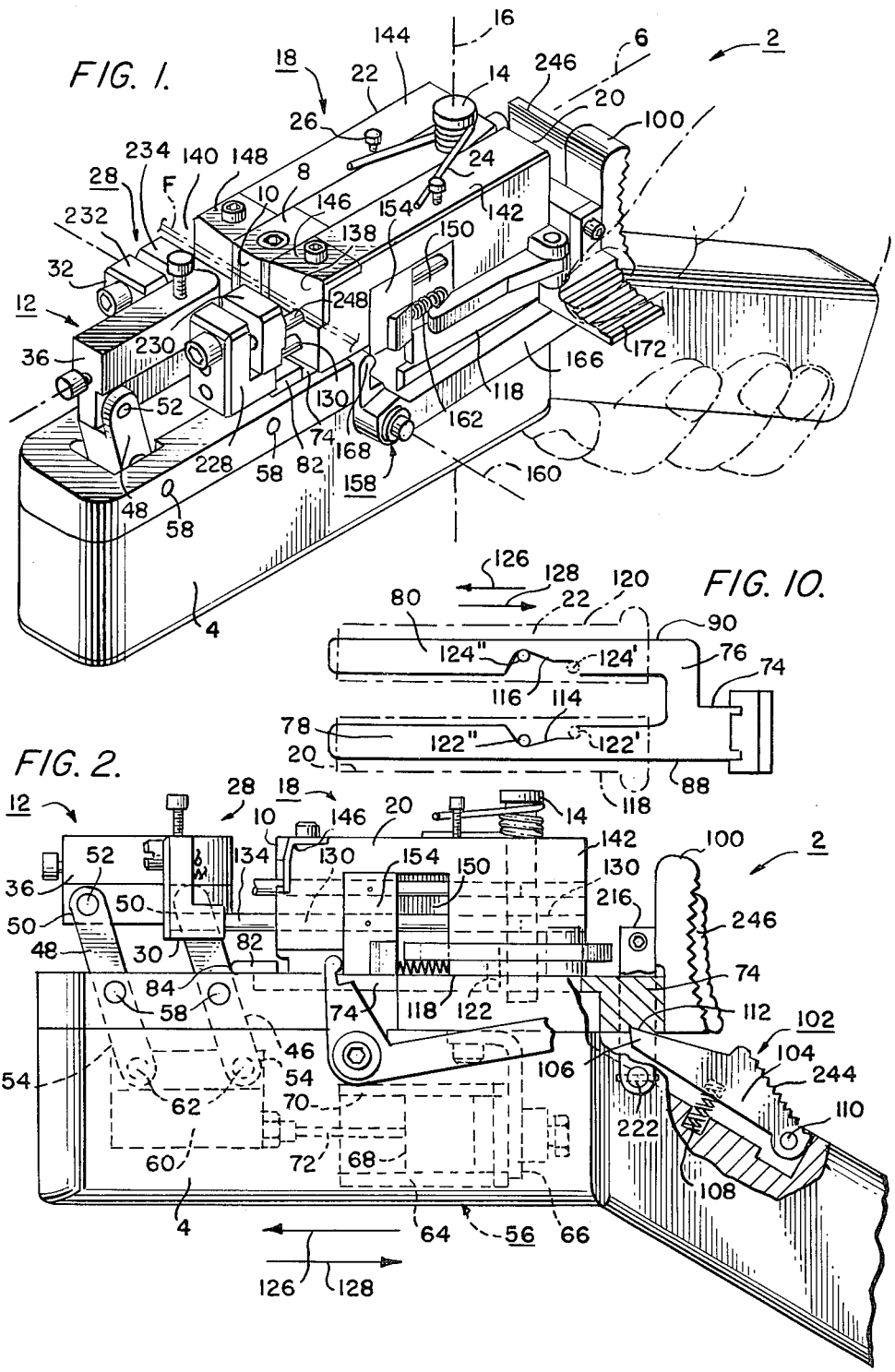

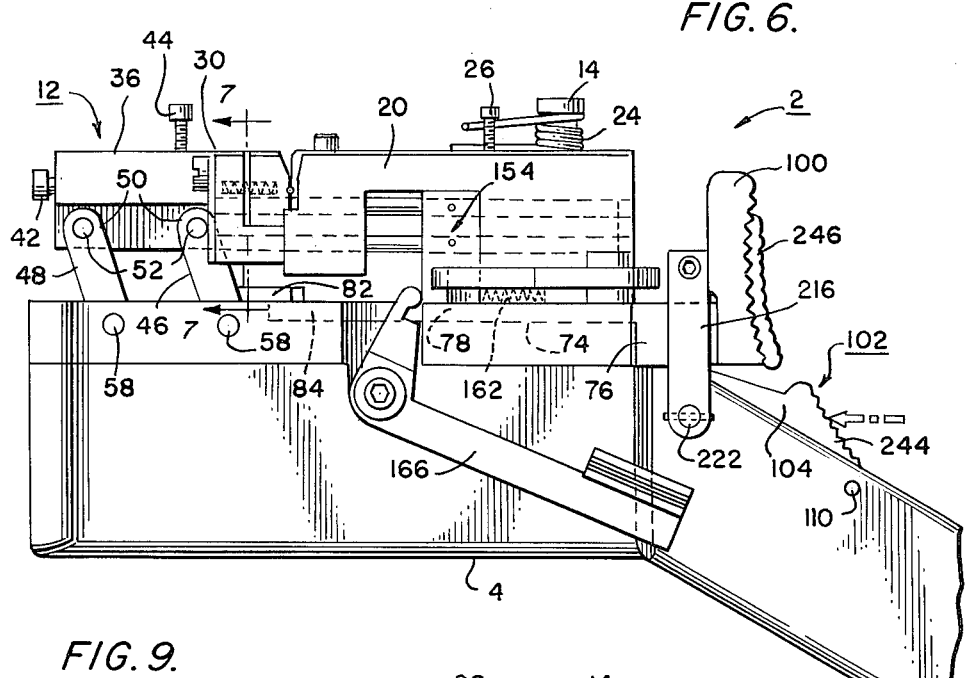
FIG. 6.
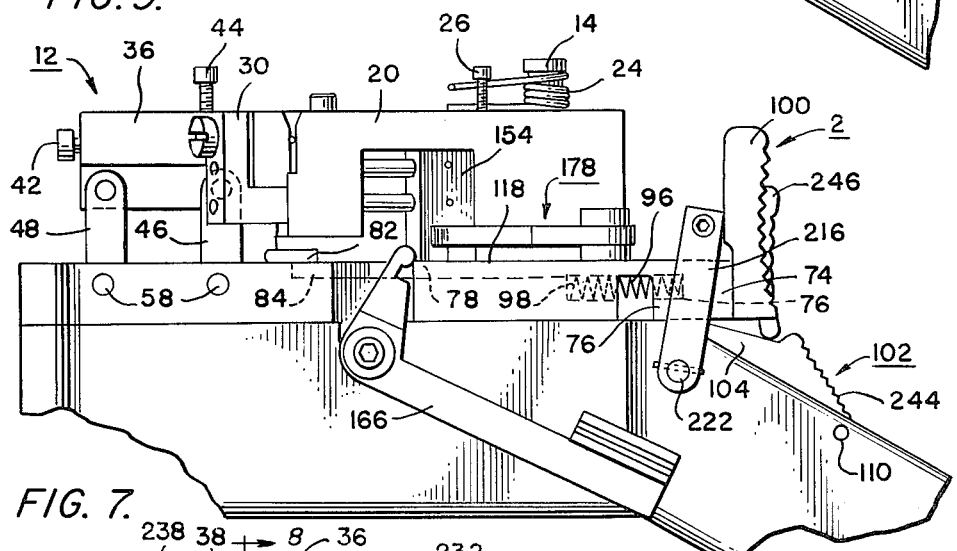
FIG. 9.
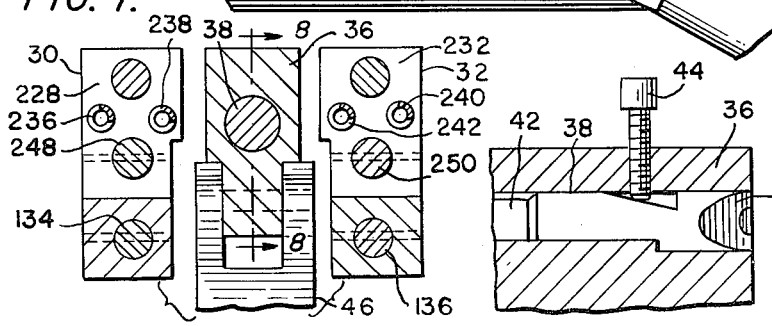
FIG. 7.
FIG. 8.

HAND HELD FIBER OPTIC CLEAVING TOOL

BACKGROUND OF THE INVENTION

This invention is directed to a tool for cleaving optical fibers.

It is often desirable to transmit light energy by means of optical fiber wave guides. For example, visible light may be transmitted to a remote location by means of a single fiber wave guide. In more complex applications multiple specific optical signals may be transmitted. An example of a more complex application is a communication system using multiple optical fiber wave guides for transmission of signals. Whether single or multiple fiber wave guides are used, such devices often require the coupling of fibers in end to end relationship. A particularly serious problem which may be incurred as a result of such coupling of fiber ends is the loss of light at the coupling. For example, if the ends of the fibers being joined are uneven excessive light loss may occur as a result of reflection and refraction of light at the junction region.

In order to minimize such light loss it is desirable to cleave optical fibers such that the faces of the fibers are smooth and lie in a plane perpendicular to the axis of the fibers. When fibers cleaved in this manner are properly joined in end to end relationship loss of light is minimized at the juncture region.

For field work it is particularly desirable to have a cleaving tool which can be simply and reliably used to properly cleave the fibers to minimize light loss when fibers are joined. It is desirable that such cleaving operation be done as quickly as possible and that the operation be easily repeatable for cleaving additional fibers and obtaining consistent results. To assure that the faces of the fiber are smooth and lie substantially in a plane perpendicular to the axis of the fibers, it is desirable to provide a hand tool which firmly clamps the fiber into position and controls the tension applied to the fiber during the cutting operation independent of operator technique. It is desired that the motion of the cleaving element or chisel also be independent of operator technique and that such motion be uniform such that the cleaving element will operate at the same speed and force in any attitudinal position, even in the absence of gravity. It is also desirable to provide a hand tool having universal application in any weather environment which tool may be hed in one hand regardless of whether the operator is right or left handed.

U.S. Pat. No. 4,257,546 to Benasutti describes an optical fiber cleaving tool including means to support and tension an optical fiber along an axis transverse to the longitudinal axis of the tool body. A cutting element is provided which is caused to move back and forth in a direction substantially normal to the axis of the optical fiber and corresponding to such longitudinal axis.

SUMMARY OF THE INVENTION

This invention achieves the foregoing objects by providing a hand held tool for cleaving optical fibers comprising an elongated body having a longitudinal axis extending lengthwise thereof. A fiber support surface is attached to the body and extends in a plane which is transverse to such longitudinal axis. Cutting means are attached to the body and are selectively moveable in the general direction of such longitudinal axis away from the fiber support surface, and towards the fiber support surface for severing an optical fiber extending across the fiber support surface. An elongated pivot member is attached to the body and extends along a first axis transverse to such longitudinal axis. Tension means is provided for subjecting the optical fiber to tension. The tension means includes a first tension arm and a second tension arm each arm being pivotally attached to the elongated pivot member for pivotal movement about such transverse axis. The first tension arm is spring biased away from the second tension arm about such transverse axis. Clamping means are provided for holding the optical fiber in place. The clamping means includes a first jaw member attached to the first tension arm and a second jaw member attached to the second tension arm. Each of the jaw members is moveable in the direction of such longitudinal axis towards and away from the arm to which each jaw member is attached. First actuating means are attached to the body and are moveable in the direction of such longitudinal axis towards and away from the cutting means for causing pivotal movement of the arms about such transverse axis to urge the arms together, and for urging the cutting means away from the fiber support surface, when the first actuating means moves towards the fiber support surface, and for allowing the arms to be pivoted about such transverse axis away from each other, and for allowing the cutting means to be moved towards the fiber support surface, when the first actuating means moves away from the fiber support surface.

BRIEF DESCRIPTION OF THE DRAWINGS

This invention may be clearly understood by reference to the drawings in which:

FIG. 1 is a perspective view of the hand held cleaving tool of the present invention;

FIG. 2 is a partial side elevational and partial sectional view of such cleaving tool in an unclamped and non-cleaving position;

FIG. 6 is a partial side elevational view of such cleaving tool in a clamped and non-cleaving position;

FIG. 7 is a sectional view taken along line 7—7 of FIG. 6;

FIG. 8 is a sectional view taken along line 8—8 of FIG. 7;

FIG. 9 is a partial side elevational view of such cleaving tool in a clamped and cleaving position; and, FIG. 10 is a plan view of a reset slide of such cleaving tool.

DESCRIPTION OF THE PREFERRED EMBODIMENT

Figure 3:
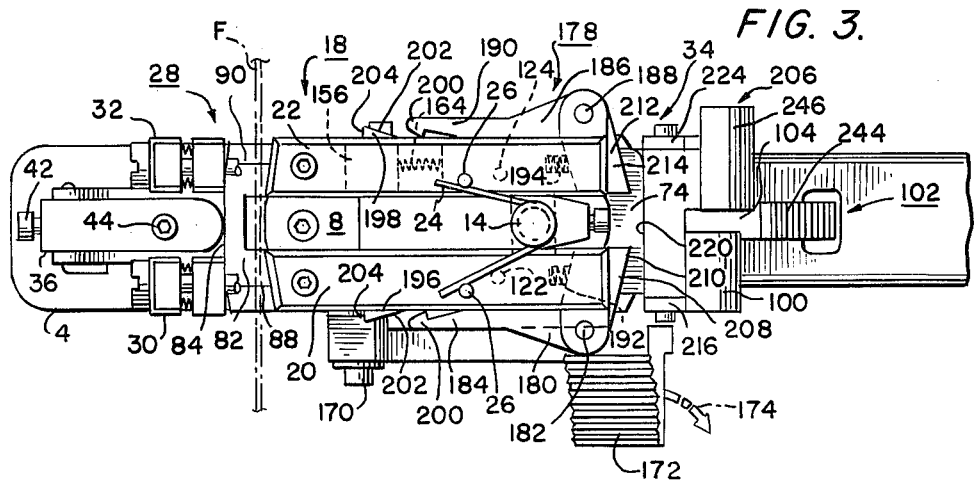
FIG. 3 is a partial plan elevational view of such cleaving tool in an unclamped and non-cleaving position.

The embodiment of this invention which is depicted in the drawings is one which is particularly suited for achieving the objects of the invention. The drawings depict a hand held tool 2 for cleaving optical fibers comprising an elongated body 4 having a longitudinal axis 6 extending lengthwise thereof. An anvil 8 having a fiber support surface 10 is attached to body 4. The surface 10 extends in a plane which is transverse to longitudinal axis 6.

Cutting means generally designated 12 are attached to the body 4 and are selectively moveable in the general direction of longitudinal axis 6 away from the fiber support surface 10, and towards the fiber support surface 10 for severing the optical fiber F extending across the surface 10.

An elongated pivot member 14 is attached to the body 4 and extends along a first axis 16 transverse to longitudinal axis 6. Tension means generally designated 18 is provided for subjecting the fiber F to tension during the cleaving operation. The tension means 18 includes a first tension arm 20 and second tension arm 22. Arms 20 and 22 are pivotally attached to elongated pivot member 14 for pivotal movement about transverse axis 16. The first tension arm 20 is spring biased away from the second tension arm 22 about transverse axis 16 as, for example, by spring 24 bearing against screws 26.

Clamping means generally designated 28 are provided for holding the fiber F in place during the cleaving operation. Clamping means 28 includes a first jaw member 30 attached to first tension arm 20 and a second jaw member 32 attached to second tension arm 22. Each of the jaw members is moveable in the direction of longitudinal axis 6 towards and away from the tension arm to which each jaw member is attached.

First actuating means generally designated 34 are attached to body 4 and are moveable in the direction of longitudinal axis 6 towards and away from cutting means 12. When first actuating means 34 moves towards fiber support surface 10 arms 20 and 22 pivot about such transverse axis and are urged together, and cutting means 12 are urged away from fiber support surface 10. When first actuating means 34 moves away from fiber support surface 10 arms 20 and 22 are allowed to pivot about transverse axis 16 away from each other under the influence of spring 24, to subject fiber F to tension and cutting means 12 is allowed to move towards fiber support surface 10 for cleaving fiber F.

In the preferred embodiment, cutting means 12 includes a cutting element support 36 including a cutting element 38 which is depicted as a chisel 40. Chisel 40 is recessed in support 36 to the extent desired to control the depth that the chisel will penetrate the fiber F during the cleaving operation. For example, referring to FIG. 8, the chisel may be adjusted by screw 42 and held in place by screw 44. Cutting element support 36 is pivotally attached to body 4 by at least one linkage member, and the drawings depict two linkage members 46 and 48. One end 50 of each linkage member is pivotally attached to the cutting element support 36 at pins 52. The other end 54 of each linkage member is attached to means generally designated 56 for urging cutting element support 36 and the cutting element 38 towards fiber support surface 10, the linkage members 46, 48 being pivotally attached to body 4 at pins 58 between ends 50 and 54. The cutting element support 36 is mounted as depicted so that the axis of the chisel 40 is perpendicular to the axis of the fiber F throughout the cleaving stroke of the chisel. Urging means 56 is depicted in FIG. 1 as including a counterweight 60 pivotally attached to linkage members 46 and 48 at pins 62. An adjustable airpot or dashpot 64 is also provided which is shown as being attached to body 4 by bracket 66. The airpot includes piston member 68 which reciprocrates in cylinder 70 in the manner known in the art, piston 68 being attached to the counterweight 60 by stem 72. The movement of piston 68 from right to left as shown in FIG. 1 causes linkage members 46 and 48 to pivot clockwise about pins 58 such that the cutting element support 36 and cutting element 38 are urged towards fiber F and the fiber support surface 10 to cleave the fiber. Use of the counterweight and adjustable airpot allow the speed of the cutting element to be controlled and to remain constant regardless of attitudinal position. Piston 68 is urged from left to right after the cleaving operation, as a result of movement of reset slide 74 towards the cutting means 12 which causes counterclockwise pivotal movement of linkage members 46 and 48 about pins 58 as described herein.

First actuating means 34 includes a forked reset slide 74 attached to body 4 and slideable in the direction of longitudinal axis 6 towards and away from cutting means 12. For example, slide 74 includes a first end portion 76 from which extends a first prong 78 and a second prong 80 spaced from the first prong. Each prong extends from the first end portion in the direction of longitudinal axis 6 towards cutting means 12. A pusher 82 forming a second end portion 84 is attached to the ends of prongs 78 and 80 which are positioned nearest the linkage member 46. Forked reset slide 74 is held within elongated cavity 86 by tension arms 20 and 22 such that the walls 88 and 90 of slide 74 are guided by the walls 92 and 94 of the cavity 86 during the slideable movement of slide 74. The reset slide 74 is spring biased away from the cutting means 12 as, for example, by spring 96 which engages the first end portion 76 and the body 4 at 98. Spring 96 is compressed when the slide 74 is moved towards the cutting means 12. Means such as thumb pad 100 are attached to the slide 74 for moving the slide towards cutting means 12. In addition, locking means generally designated 102 are attached to body 4 for locking the reset slide 74 in engagement with cutting means 12. For example, a locking member 104 may be provided having one end 106 which is spring biased towards reset slide 74 by spring 108 which engages the body 4 and locking member 104. The other end of the locking member 104 is pivotally attached at pin 110 to body 4 for pivotal movement of end 106 into an opening 112 in the reset slide 74 under the biasing of spring 108 when the reset slide is moved or caused to slide towards cutting means 12 and opening 112 and end 106 of the locking member 104 are in alignment.

Referring to FIG. 10, First prong 78 comprises a first camming surface 114 and second prong 80 comprises a second camming surface 116 spaced from the first camming surface. Each of the tension arms includes a cam which extends from the bottom surfaces 118 and 120 of each arm into the space between prongs 78 and 80 and into engagement with an adjacent camming surface. For example, first tension arm 20 includes a first cam 122 extending from surface 118 and engaging first camming surface 114. Similarly, second tension arm 22 includes a second cam 124 extending from surface 120 and engaging second camming surface 116. Reset slide 74 is slideable in the direction of longitudinal axis 6 towards cutting element 38 for engagement of pusher 82 with linkage member 46 to urge the cutting element away from fiber support surface 10. Such movement of the slide 74 also causes relative movement of cam 122 and camming surface 114 and corresponding relative movement of cam 124 and camming surface 116 for causing pivotal movement of arms 20 and 22 about transverse axis 16 to urge the arms together. For example, with reference to FIG. 10, as reset slide 74 moves in the direction of arrow 126 towards the cutting element 38 the camming surfaces 114 and 116 slide relative to cams 122 and 124 respectively, until such time as the cams are at the high point of their respective camming surfaces as depicted in phantom lines at 122' and 124'. Such motion causes the arms 20 and 22 to pivot towards each other about elongated pivot member 14. In a similar manner, reset slide 74 is slideable in the direction of longitudinal axis 6 away from cutting element 12 for disengagement of pusher 82 from linkage member 46 to allow the cutting element 38 to be moved towards fiber support surface 10 under the action of the urging means 56. Such movement of the slide member also causes relative movement of cam 122 and camming surface 114 and corresponding relative movement of cam 124 and camming surface 116 for allowing pivotal movement of arms 20 and 22 about transverse axis 16 under the influence of spring 24 which urges the arms away from each other. For example, as reset slide 74 moves in the direction of arrow 128 away from cutting element 38 the camming surfaces 114 and 116 slide relative to cams 122 and 124, respectively, until such time as the cams are at the low point of their respective camming surfaces as depicted in solid lines at 122" and 124". Such motion allows the arms 20 and 22 to pivot away from each other about elongated pivot member 14 under the influence of spring 24.

In the preferred embodiment, first jaw member 30 and second jaw member 32 are spring biased away from first tension arm and second tension arm, respectively. For example, first tension arm 20 includes at least one first bore 130 therein and second tension arm 22 includes at least one similar second bore 132 therein. A first rod 134 extends into first bore 130 and a second rod 136 extends into second bore 132. First jaw member 30 is attached to one end of first rod 134 and is spaced from the first tension arm 20 to form a clamp opening 138. Similarly, second jaw member 32 is attached to one end of second rod 136 and is spaced from the second tension arm 22 to form a clamp opening 140. Tension arms 20 and 22 each include one end 142 and 144, respectively, which are pivotally attached to elongated pivot member 14. Each arm 20 and 22 also include another end 146 and 148 which is attached to jaw members 30 and 32, respectively. An intermediate cavity 150, 152 is provided between the ends of each arm. First bore 130 extends from end 146 and into end 142, and second bore 132 extends similarly from end 148 and into end 144. Rod 134 extends through bore 130 and across cavity 150 and rod 136 extends through bore 132 and across cavity 152. A latch block 154 is attached to first rod 134 where rod 134 extends across cavity 150, and a corresponding latch block 156 is attached to second rod 136 where rod 136 extends across cavity 152.

Means generally designated 158 are attached to body 4 and are pivotal about another axis 160 which is transverse to longitudinal axis 6 and first transverse axis 16 for sliding the rods relative to their respective bores to urge first and second jaws 30 and 32 towards and into engagement with first and second tension arms 20, 22, respectively, against the biasing of springs 162 and 164 to sandwich fiber F between the jaws and the tension arms. For example, the sliding means 158 may be pivotal relative to latch blocks 154 and 156 to engage and urge such blocks towards end 142 and 144 of arms 20 and 22, respectively, to slide the rods 134 and 136 relative to their respective bores to urge the first and second jaws towards and into engagement with their respective first and second tension arms against the biasing of springs 162 and 164. To this end sliding means 158 may include a lever 166 one end 168 of which engages latch block 154. Lever 166 is pivotally attached to body 4 by pin 170 at a position spaced from end 168. By pushing thumb pad 172 in the direction of arrow 174, lever 166 pivots about pin 170 to urge end 168 against latch block 154 to urge the latch block towards end 142 of arm 20. Pin 170 extends through body 4 and is attached to an extended end 176 of lever 166 which is pivoted in a similar manner to engage and move latch block 156.

Latching means generally designated 178 may be provided for locking the first and second jaw members in engagement with their respective first and second tension arms to clamp and hold fiber F into place during the cleaving operation. For example, a first latching lever 180 may be provided having one end pivotally attached to first arm 20 at pin 182 and having another end which includes a first latching member 184. A second latching lever 186 may be provided having one end pivotally attached to second arm 22 at pin 188 and having another end which includes a second latching member 190. First and second latching members 184 and 190 are spring biased towards first and second block members 154 and 156, respectively, as for example, by springs 192 and 194. First latch block 154 comprises a first mating latching member 196 and second latch block 156 comprises a second mating latching member 198. When the first and second jaws are in engagement with the first and second tension arms, respectively, the first mating latching member 196 locks with the first latching member 184 and the second mating latching member 198 locks with the second latching member 190 to hold the latch blocks and therefore the jaws in place during the cleaving operation. For example, as depicted in the drawings, each latching member has a hooked end 200 which slides along an inclined portion 202 of its respective mating latching member until such time as the fiber F has been clamped and the hooked ends are biased by springs 192 and 194 towards blocks 154 and 156, respectively, and locked in place against walls 204.

Means generally designated 206 are pivotally attached to the body 4 for selectively releasing the latching members from their respective mating latching members. For example, end 208 of first latching lever 180 includes a first bearing surface 210 and end 212 of second latching lever 186 includes a second bearing surface 214. At least one elongated linkage 216 is provided one end of which is attached to a member 218 including a third bearing surface 220 and the other end of which is pivotally connected to body 4 at pin 222. The drawings depict a second elongated linkage 224 having one end which is attached to member 218 and another end of which is pivotally connected to body 4 at pin 222 which extends through body 4. Third bearing surface 220 may be pivoted through elongated linkages 216 and 224 about pin 222 into engagement with the first and second bearing surfaces 210 and 214 causing latching levers 180 and 186 to pivot about their respective pins 182 and 188 against the biasing of their respective springs 192 and 194 to release the latching members 184 and 190 from mating latching members 196 and 198, respectively. Member 218 and third bearing surface 220 are spring biased away from the first and second bearing surfaces, as for example, by a spring (not shown).

In the embodiment depicted in the drawings the first jaw member 30 includes a first clamp end 228 attached to rod 134 and a first clamp pad 230 slideably attached to rod 248 between first clamp end 228 and first tension arm 20. Similiarly, second jaw member 32 includes a second clamp end 232 attached to rod 136 and a second clamp pad 234 slideably attached to rod 250 between clamp end 232 and second tension arm 22. The first and second clamp pads are spring biased away from their respective first and second clamp ends by, for example, springs 236 and 238, and 240 and 242, respectively.

Figure 4:
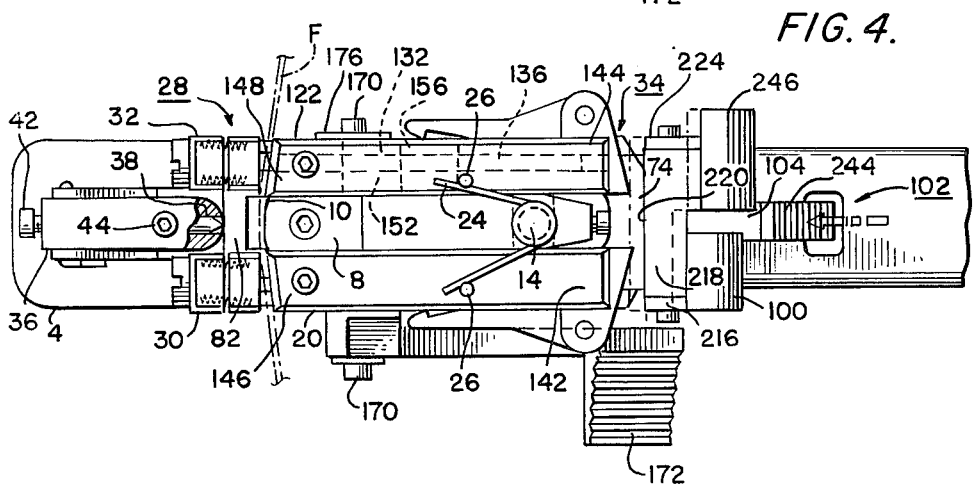
FIG. 4 is a partial plan elevational view of such cleaving tool in a clamped and non-cleaving position.

In operation, thumb pad 100 is pushed to urge or slide reset slide 74 in the direction of longitudinal axis 6 towards cutting element 36 for engagement of pusher 82 with linkage member 46 to urge cutting element 38 away from fiber support surface 10. Such movement of slide 74 also causes movement of cams 122 and 124 relative to camming surfaces 114 and 116, as described herein, to pivot tension arms 20 and 22 about elongated pivot member 14 towards each other. Reset slide 74 is slid in this manner until the tension arms and cutting element assume the positions depicted in FIGS. 1, 2 and 3 at which positions opening 112 and end 106 of locking member 104 will be in alignment so that locking member 104 will be urged about pin 110 by spring 108 allowing end 106 to be pivoted into opening 112 to lock the reset slide 74 in place. The end of a fiber is stripped of buffer material and the fiber is laid across fiber support surface 10 between the jaws 30 and 32 and the tension arms 20 and 22 in such a manner that the buffer material may be gripped between jaw 30 and the end of tension arm 20 and the end of the fiber not covered with buffer material extends across the fiber support surface 10 and may be gripped between jaw 32 and the end of tension arm 22. Such position is generally depicted in FIG. 3. Pressure is then exerted upon thumb pad 172 causing lever 166 to pivot about pin 170 so that ends 168 and 176 engage and urge latch blocks 154 and 156 towards ends 142 and 144 of arms 20 and 22, respectively, to slide the rods 134 and 136 relative to their respective bores to urge the first and second jaws towards and into engagement with their respective first and second tension arms against the biasing of springs 162 and 164 to clamp or hold fiber F between the jaws and clamps. In the embodiment depicted in the drawings, during this part of the operation the first and second clamp pads 230 and 234 will engage fiber F and the first and second tension arms respectively, and will cease movement as the first and second clamp ends 228 and 232 continue to move towards their respective tension arms. Such motion of clamp ends 228 and 232 compresses springs 236 and 238, and 240 and 242, respectively, thereby causing the clamp pads to firmly sandwich the fiber between the clamp pads and the tension arms. As the fiber is being clamped between the jaws and the tension arms latching levers 180 and 186 are caused to pivot about pins 182 and 188 as a result of the interaction of the first and second latching members 184 and 190 with their respective first mating latching members 196 and 198 to lock the jaws in place as described herein. Such a position is depicted in FIGS. 4 and 6.

Figure 5:
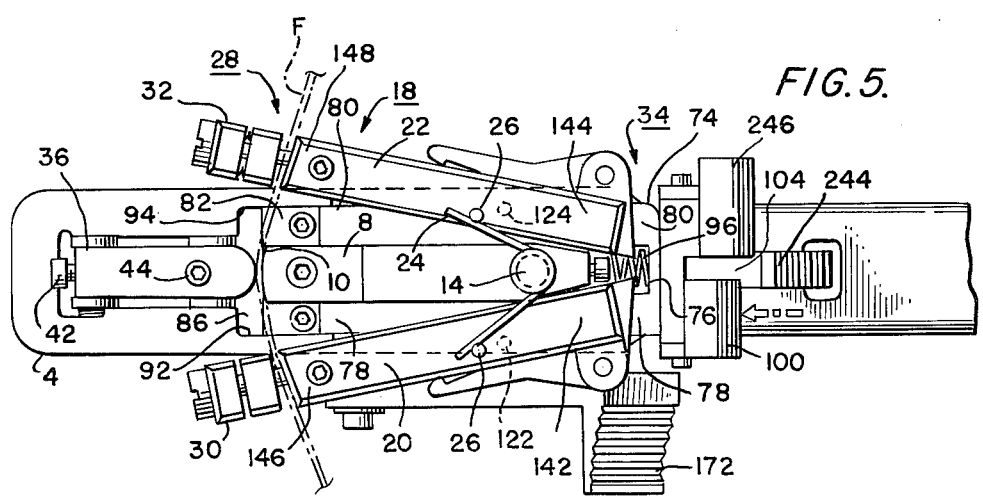
FIG. 5 is a partial plan elevational view of such cleaving tool in a clamped and cleaving position.

Fiber F is cleaved by depressing thumb pad 244 which causes locking member 104 to pivot about pin 110 thereby compressing spring 108 and causing end 106 to pivot out of opening 112 in reset slide 74. As end 106 is removed from opening 112 spring 96 bears against reset slide 74 to urge reset slide 74 away from cutting means 12 thereby disengageing pusher 82 from linkage member 46. Such disengagement causes the linkage members 46 and 48 to pivot about pins 58 as described herein so that the cutting element support and cutting element are urged towards fiber support surface 10 to cleave fiber F under the action of dash pot 64. In addition, as reset slide is being urged away from cutting means 12, and before the cutting element engages the fiber F, camming surfaces 114 and 116 are moving relative to cams 122 and 124 of prongs 78 and 80 from the high points of the camming surfaces towards the low points of the camming surfaces allowing the tension arms and their associated jaw members to pivot away from each other about elongated member 14 under the influence of spring 24 to subject the fiber F to tension during the cleaving operation. As the fiber is cleaved, further movement of the reset slide causes the pins to engage the high points of the camming surfaces so that the clamped ends of the cleaved fiber are urged apart under the influence of spring 24. Such a position is depicted in FIGS. 5 and 9.

The cleaved fiber may be removed from the tool by depressing thumb pad 246 so that bearing surface 220 engages bearing surfaces 210 and 214 causing latching levers 180 and 186 to pivot about their respective pins 182 and 188 to release the hooked ends 200 of the latching members 184, 190 from walls 204 of the mating latching members 196 and 198 respectively. Such release causes the clamps to open as the jaw members are urged away from the tension arms under the influence of springs 162 and 164 bearing against latch blocks 154 and 156.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A hand held tool for cleaving optical fibers comprising:
   an elongated body having a longitudinal axis extending lengthwise thereof;
   a fiber support surface attached to said to said body and exending in a plane which is transverse to said longitudinal axis;
   cutting means attached to said body and being selectively moveable in the general direction of said longitudinal axis away from said fiber support surface, and towards said fiber support surface for severing an optical fiber extending across said fiber support surface;
   an elongated pivot member attached to said body and extending along a first axis transverse to said longitudinal axis;
   tension means for subjecting said optical fiber to tension comprising a first tension arm and a second tension arm, each arm being pivotally attached to said elongated pivot member for pivotal movement about said transverse axis, said first tension arm being spring biased away from said second tension arm about said transverse axis;
   clamping means for holding said optical fiber in place, comprising a first jaw member attached to said first tension arm and a second jaw member attached to said second tension arm, each of said jaw members being moveable in the direction of said longitudinal axis towards and away from the arm to which each jaw member is attached; and,
   first actuating means attached to said body moveable in the direction of said longitudinal axis towards and away from said cutting means for causing pivotal movement of said arms about said transverse axis to urge said arms together, and for urging said cutting means away from said fiber support surface, when said first actuating means moves towards said fiber support surface, and for allowing said arms to be pivoted about said transverse axis away from each other, and for allowing said cutting means to be moved towards said fiber support surface, when said first actuating means moves away from said fiber support surface and wherein said cutting means comprises a cutting element support including a cutting element, at least one linkage member one end of which is pivotally attached to said cutting element support, the other end of said linkage member being attached to means for urging said cutting element support towards said fiber support surface, said linkage member also being pivotally attached to said body at a position between said ends and wherein said first actuating means includes a forked reset slide attached to said body and slideable in the direction of said longitudinal axis towards and away from said cutting means, said reset slide being spring biased away from said cutting means and having a first end portion, a first prong extending from said first end portion in the direction of said longitudinal axis towards said cutting means, a second prong spaced from said first prong and extending from said first end portion in the direction of said longitudinal axis towards said cutting means, and a pusher forming a second end portion attached to that end of each of said prongs which is positioned nearest said linkage member, and further includes means attached to said slide for moving said slide towards said cutting means and means attached to said body for locking said slide in engagement with said cutting means.

2. The hand tool of claim 1 wherein said first prong comprises a first camming surface and said second prong comprises a second camming surface spaced from said first camming surface; wherein said first tension arm includes a first cam which engages said first camming surface and said second tension arm includes a second cam which engages said second camming surface; wherein said reset slide is slideable in said longitudinal direction towards said cutting element for engagement of said pusher with said linkage member to urge said cutting element away from said fiber support surface and for relative movement of said cams and said camming surfaces for causing said pivotal movement of said arms about said transverse axis to urge said arms together; and, wherein said reset slide is slideable in said longitudinal direction away from said cutting element to disengage said pusher from said linkage member to allow said cutting element to be moved towards said fiber support surface by said urging means and for relative movement of said cams and said camming surfaces for allowing said arms to be pivoted about said transverse axis away from each other.

3. The hand tool of claim 2 wherein said first and second jaw members are spring biased away from said first and second tension arms, respectively, said first tension arm including at least one first bore therein and said second tension arm including at least one second bore therein, a first rod extending into said first bore and a second rod extending into said second bore, said first jaw member being attached to one end of said first rod and spaced from said first tension arm and said second jaw member being attached to one end of said second rod and spaced from said second tension arm; and, wherein means are provided attached to said body pivotal about another axis which is transverse to said longitudinal axis and said first transverse axis for sliding said rods relative to said bores to urge said first and second jaws towards and into engagement with said first and second tension arms, respectively, against said spring biasing.

4. The hand tool of claim 3 wherein each of said tension arms includes one end which pivotally attached to said elongated pivot member, another end to which is attached one of said jaw members, and an intermediate cavity between said ends; wherein in each of said arms said bore extends from said other end and into said one end, said rod extends through said bore and across said cavity, and a latch block is attached to said rod where said rod extends across said cavity; and, wherein said sliding means are pivotal relative to said latch blocks to engage and urge said latch blocks towards said one ends to slide said rods relative to said bores to urge said first and second jaws towards and into engagement with said first and second tension arms, respectively, against said spring biasing.

5. The hand tool of claim 4 wherein said sliding means includes a lever one end of which engages said latch blocks, said lever being pivotally attached to said body at a position spaced from said one end of said lever, and latching means for locking said first and second jaw members in engagement with said first and second tension arms, respectively.

6. The hand tool of claim 5 wherein said latching means comprises a first latching lever one end of which is pivotally attached to said first arm and the other end of which includes a first latching member, a second latching lever one end of which is pivotally attached to said second arm and the other end of which includes a second latching member, said first and second latching members being spring biased toward said first and second block members, respectively, said first block member comprising a first mating latching member and said second block member comprising a second mating latching member, said first and second mating latching members locking with said first and second latching members, respectively, when said jaws are in engagement with said arms, and means pivotally attached to said body for selectively releasing said latching members from said mating latching members.

7. The hand tool of claim 6 wherein said one end of said first latching lever includes a first bearing surface and said one end of said second latching lever includes a second bearing surface, and wherein said releasing means includes at least one elongated linkage one end of which includes a third bearing surface and the other end of which is pivotally connected to said body for pivoting said third bearing surface into engagement with said first and second bearing surfaces to release said latching members from said mating latching members, said third bearing surface being spring biased away from said first and second bearing surfaces.

8. The hand tool of claim 1, 2, 3, 4, 5, 6 or 7 wherein said reset slide comprises an opening and said locking means includes a locking member one end of which is spring biased towards said reset slide and the other end of which is pivotally attached to said body for pivotal movement under said spring biasing of said one end of said locking member into said opening when said reset slide is moved towards said cutting means and said opening and said one end of said locking member are in alignment.

9. The hand tool of claim 8 wherein said first jaw member includes a first clamp end attached to said first rod and a first clamp pad slideably attached to said first clamp end between said first clamp end and said first tension arm, and second jaw member includes a second clamp end attached to said second rod and second clamp pad slideably attached to said second clamp end between said second clamp end and said second tension arm, said first and second clamp pads being spring biased away from said first and second clamp ends, respectively.

* * * * *